US009612139B2

(12) United States Patent
Nakayama (10) Patent No.: US 9,612,139 B2
(45) Date of Patent: Apr. 4, 2017

(54) POSITION DETECTING DEVICE (71) Applicant: ALPS ELECTRIC CO., LTD., Ota-ku, Tokyo (JP)

(72) Inventor: Keisuke Nakayama, Tokyo (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 21 days.

(21) Appl. No.: 14/749,003

(22) Filed: Jun. 24, 2015

(65) Prior Publication Data

US 2015/0377649 A1 Dec. 31, 2015

(30) Foreign Application Priority Data

Jun. 27, 2014 (JP) ................................ 2014-132233

(51) Int. Cl.
| G01B 7/14 | (2006.01) |
| G01B 7/30 | (2006.01) |
| G01D 11/24 | (2006.01) |
| G01D 5/14 | (2006.01) |

(52) U.S. Cl.
CPC ........... *G01D 11/245* (2013.01); *G01D 5/145* (2013.01)

(58) Field of Classification Search
CPC ...... G01D 5/145; G01D 11/245; G01B 7/003; G01R 33/0047
USPC ................................... 324/207.25
See application file for complete search history.

(56) References Cited

U.S. PATENT DOCUMENTS

| 5,736,635 | A | 4/1998 | Onodera | |
| 6,566,865 | B2 | 5/2003 | Yasuda et al. | |
| 7,557,568 | B2 * | 7/2009 | Terasaki | F15B 15/2861 324/207.2 |
| 8,418,827 | B2 * | 4/2013 | Ishida | E05F 15/603 192/30 W |

FOREIGN PATENT DOCUMENTS

| JP | 3162280 | 2/2001 |
| JP | 2001-133469 | 5/2001 |
| JP | 2002-156245 | 5/2002 |

* cited by examiner

*Primary Examiner* — Reena Aurora
(74) *Attorney, Agent, or Firm* — Hunton & Williams LLP

(57) ABSTRACT

A position detecting device includes a shaft part that rotates in conjunction with a rotation of an external driving body, a magnet that is integrally provided at one end of the shaft part, a substrate on which a detecting element detecting a magnetic field of the magnet is mounted, a case that includes a disposition portion in which one end of the shaft part and the substrate are disposed, a protective member into which the other end of the shaft part is inserted and which covers the disposition portion, and a seal member that is disposed between the case and the protective member. A support member supporting one end of the shaft part and a bearing supporting the shaft part are mounted on the protective member. The protective member is provided with a protrusion, and the support member is provided with a fitting portion to which the protrusion is fitted.

4 Claims, 10 Drawing Sheets

POSITION DETECTING DEVICE

CLAIM OF PRIORITY

This application contains subject matter related to and claims the benefit of Japanese Patent Application No. 2014-132233 filed on Jun. 27, 2014, the entire contents of which is incorporated herein by reference.

BACKGROUND OF THE DISCLOSURE

1. Field of the Disclosure

The present disclosure relates to a position detecting device that detects the rotational position of a driving body.

2. Description of the Related Art

A contactless detecting device, which uses a permanent magnet and a detecting element for detecting a magnetic field, is used.

Since a mechanism for detecting a rotational position or the like causes fewer issues by wear and the like, the contactless detecting device is used in various industrial fields.

Japanese Unexamined Patent Application Publication No. 2002-156245 discloses a structure in which a cup disposed between a holder (case) and a housing and a rotating shaft mounted on the cup are disposed so as to be received by a bearing of the housing.

Figure 10:
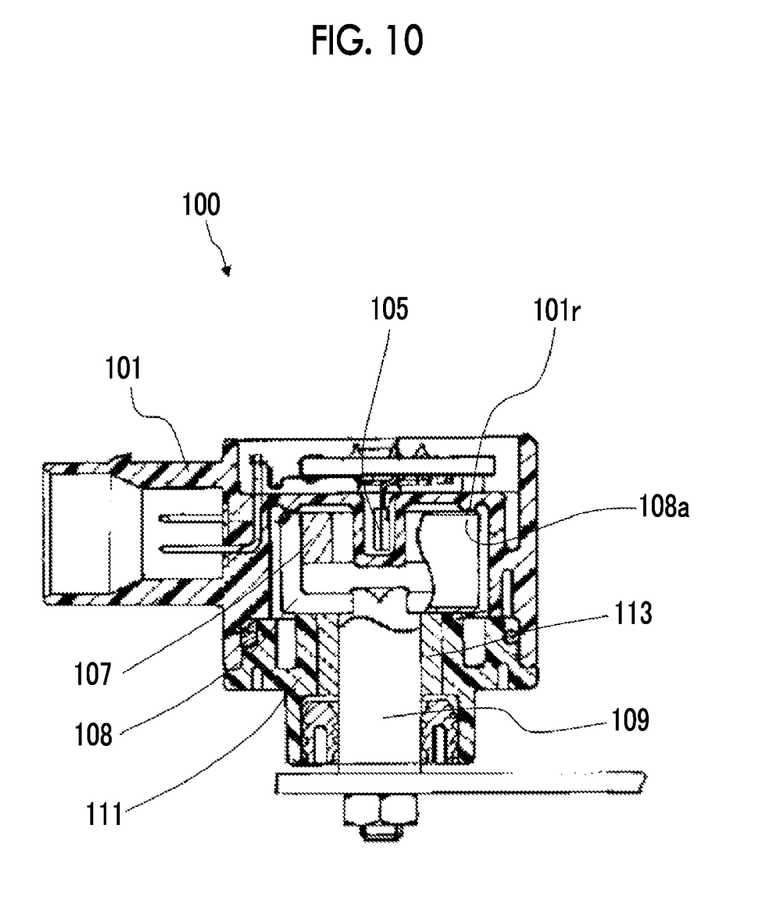
FIG. 10 is a sectional view of a contactless displacement sensor in the related art.

FIG. 10 is a sectional view of a contactless displacement sensor 100 disclosed in Japanese Unexamined Patent Application Publication No. 2002-156245. The contactless displacement sensor 100 includes a permanent magnet 107 that is provided in a cup 108 fixed to a rotating shaft 109 rotating together with the displacement of an object to be detected and a Hall element 105 that detects the rotation of the permanent magnet 107 in a contactless manner, and detects the displacement of the object to be detected by the Hall element 105.

The housing 111 restricts the movement of the rotating shaft 109 to one side in an axial direction by the bottom of the cup 108 that is fixed to the rotating shaft 109. The holder 101 comes into contact with an end portion 108a of the cup 108, which is fixed to the rotating shaft 109, at a plurality of positions and restricts the movement of the rotating shaft 109 to the other side in the axial direction by a restriction portion 101r. As shown in FIG. 10, the tilt of the rotating shaft 109 with which the cup 108 is integrated is suppressed by the bearing 113 provided in the housing 111 and the restriction portion 101r provided in the holder 101.

However, because the housing 111 and the holder 101 are separate bodies, it is difficult to obtain accuracy in restricting the tilt of the shaft.

These and other drawbacks exist.

SUMMARY OF THE DISCLOSURE

Example embodiments of the disclosure provide a position detecting device that can accurately suppress the tilt of a rotating shaft.

According to an example embodiment, a position detecting device includes a shaft part that rotates in conjunction with a rotation of an external driving body, a magnet that is integrally provided at one end of the shaft part, a substrate on which a detecting element for detecting a magnetic field of the magnet is mounted, a case that includes a bottomed disposition portion in which one end of the shaft part and the substrate are disposed, a protective member into which the other end of the shaft part is inserted so as to protrude to the outside and which is mounted so as to cover the disposition portion, and a seal member that is disposed between the case and the protective member. A support member, which supports one end of the shaft part, and a bearing, which supports the shaft part so as to allow the shaft part to be rotatable, are integrally mounted on the protective member. One of the protective member and the support member is provided with a protrusion, the other thereof is provided with a fitting portion to which the protrusion is fitted, and the protrusion is fitted to the fitting portion.

According to this structure, since the support member and the bearing supporting the shaft part are integrated with the protective member, the shaft part can be supported by only the protective member as a base. Accordingly, it is possible to accurately suppress the tilt of a rotating shaft without any variation in accuracy when the protective member is mounted on the case through the seal member.

Further, in the position detecting device according to the aspect of the invention, the protective member may include a cylindrical portion to which the bearing is fitted, a contact portion that comes into contact with the support member, and a stepped portion on which the seal member is disposed, and the support member may include a flange portion that protrudes outward from an outer periphery of the contact portion along a surface coming into contact with the contact portion.

According to this structure, since the seal member does not deviate in the axial direction, the disposition portion can be hermetically sealed from the outside.

Furthermore, in the position detecting device according to the various embodiments, the support member may include a protruding portion that supports one end of the shaft part and may be fitted to and integrated with the protective member while supporting the shaft part so as to allow the shaft part to be rotatable.

According to this structure, the shaft part, the protective member, and the support member can be integrally assembled after the magnet is fitted to the shaft part.

According to the various embodiments, since the support member and the bearing supporting the shaft part are integrated with the protective member, the shaft part can be supported by only the protective member as abase. Accordingly, it is possible to provide a position detecting device that can accurately suppress the tilt of a rotating shaft without any variation in accuracy when the protective member is mounted on the case through the seal member.

DETAILED DESCRIPTION OF THE DISCLOSURE

The following description is intended to convey a thorough understanding of the embodiments described by providing a number of specific embodiments and details involving a position detecting device and intake pressure measurement apparatus. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

An example embodiment is described below in detail with reference to the drawings. Meanwhile, for easy understanding, dimensions are appropriately changed in the drawings.

Figure 1:
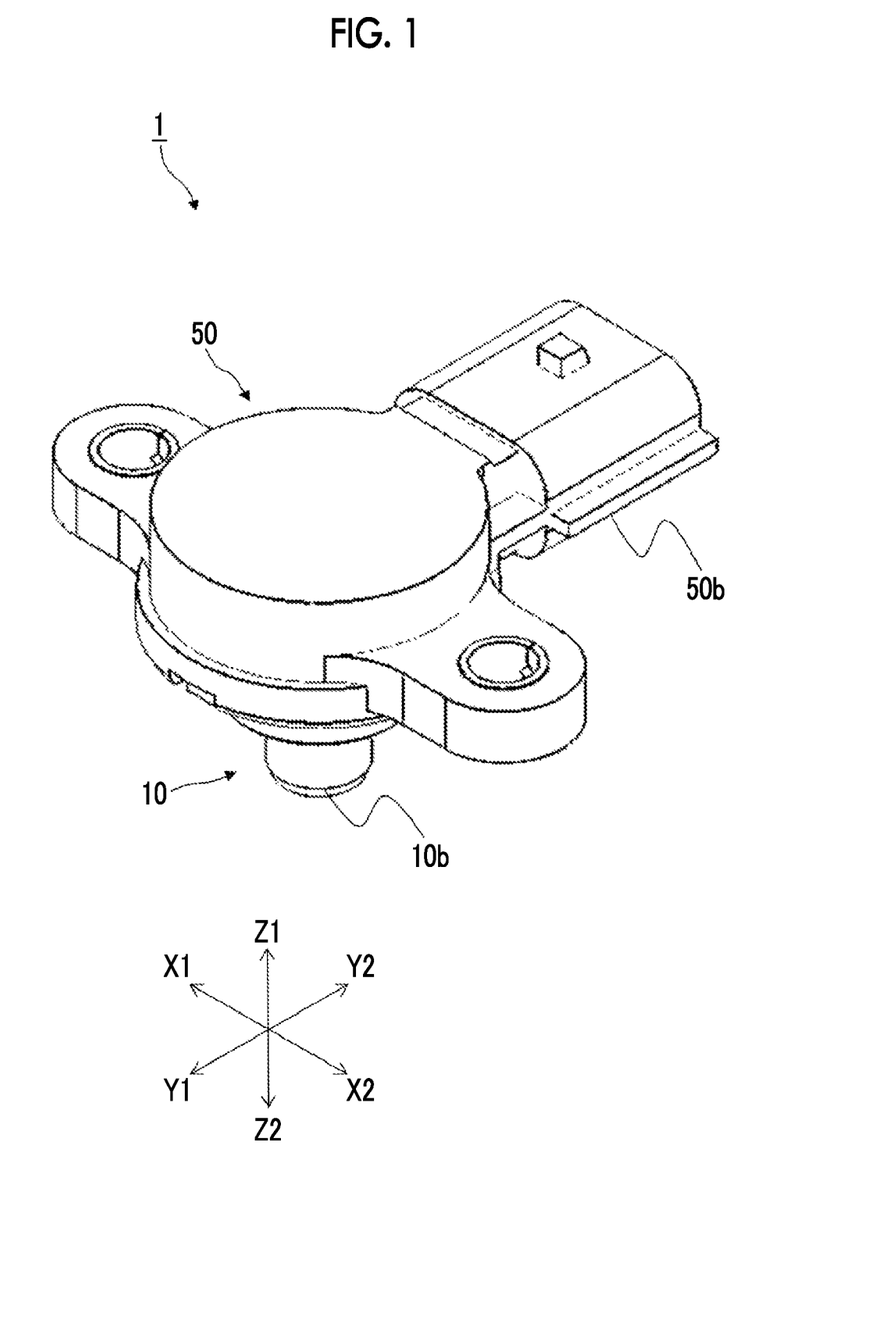
FIG. 1 is a perspective view of a position detecting device according to an example embodiment of the disclosure.
Figure 2:
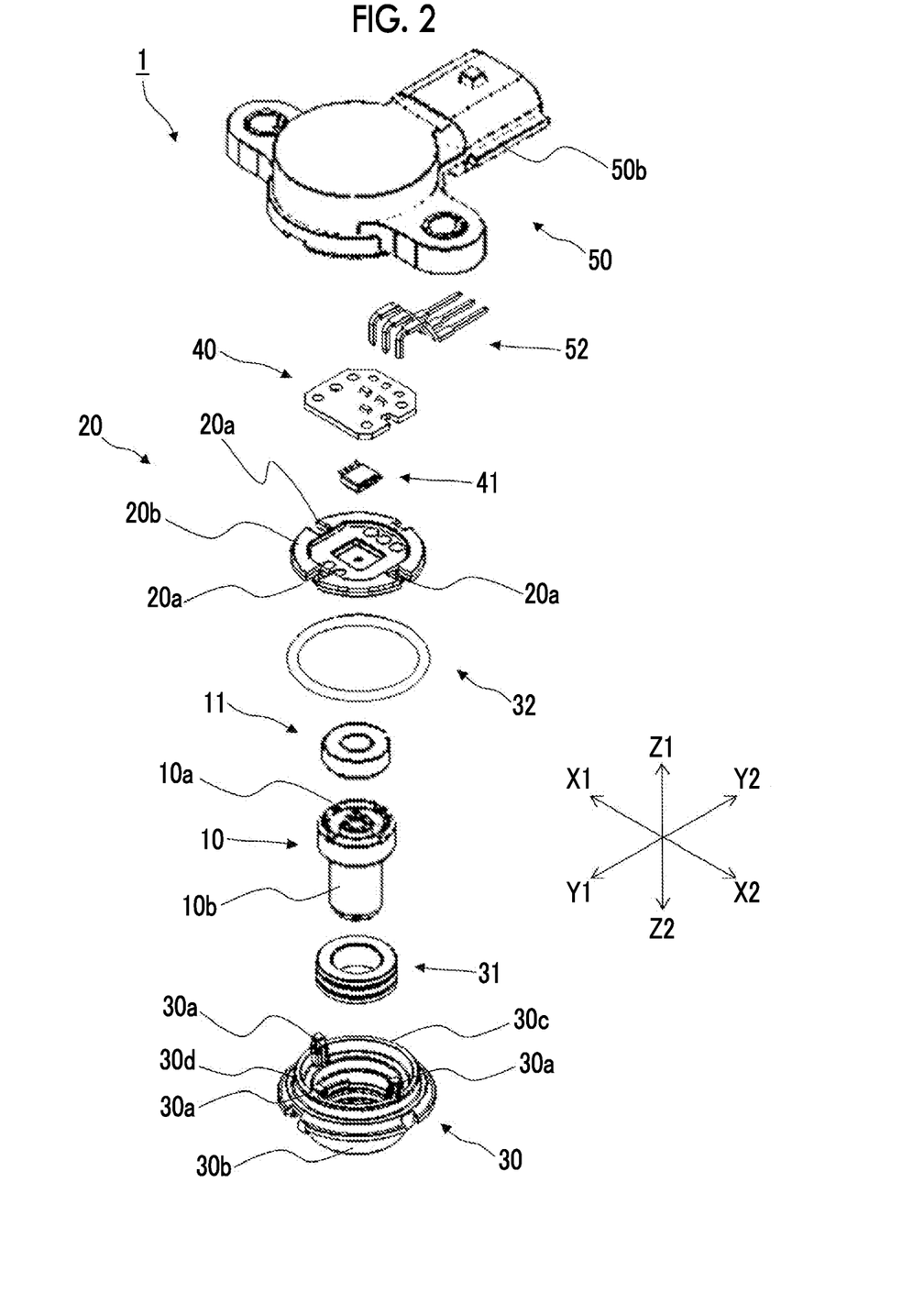
FIG. 2 is an exploded perspective view of the position detecting device according to an example embodiment of the disclosure.
Figure 3:
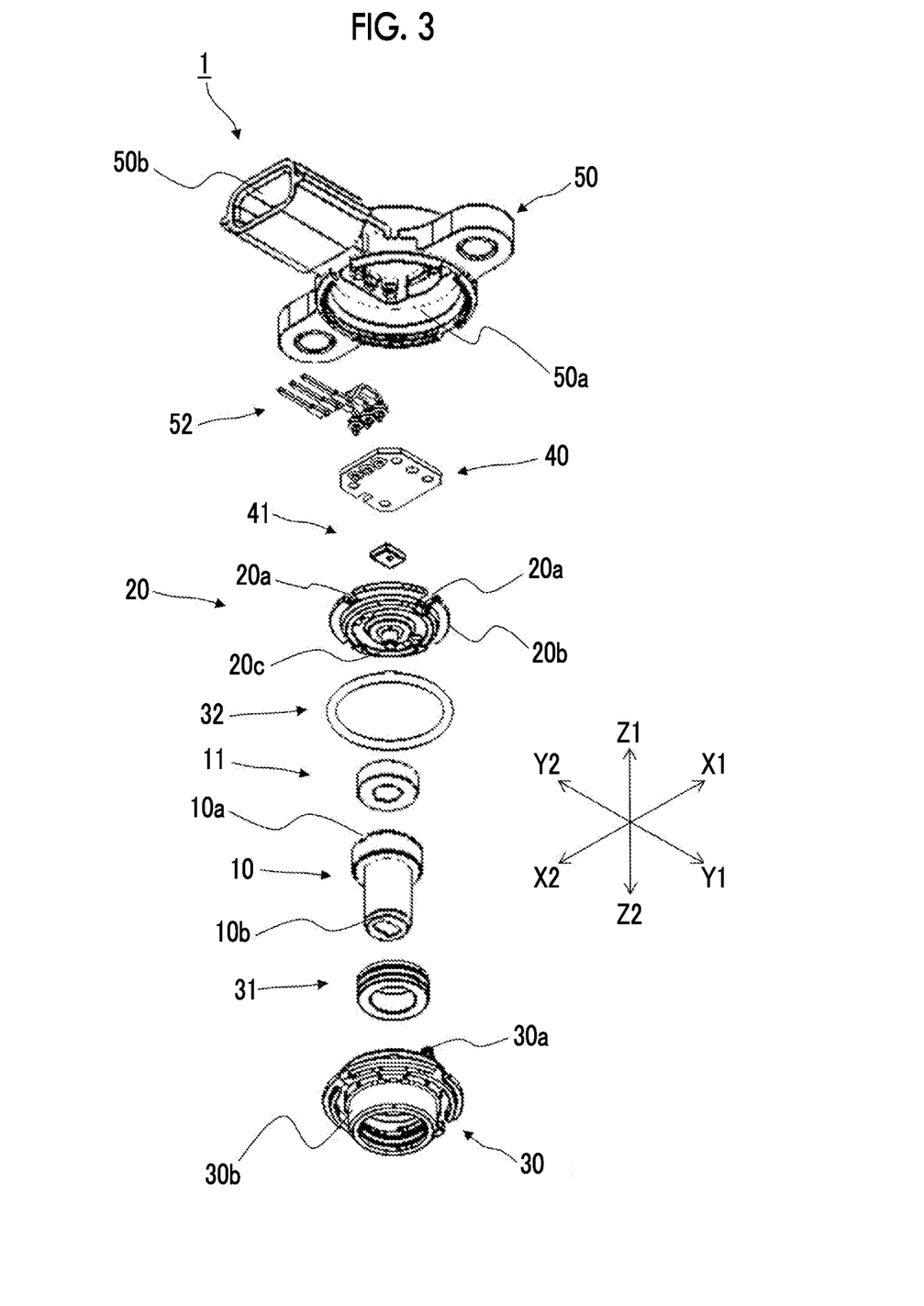
FIG. 3 is an exploded perspective view seen in a direction different from a direction in FIG. 2.

FIG. 1 is a perspective view of a position detecting device 1 according to an example embodiment. FIG. 2 is an exploded perspective view of the position detecting device 1. FIG. 3 is an exploded perspective view seen in a direction different from a direction in FIG. 2.

Figure 4:
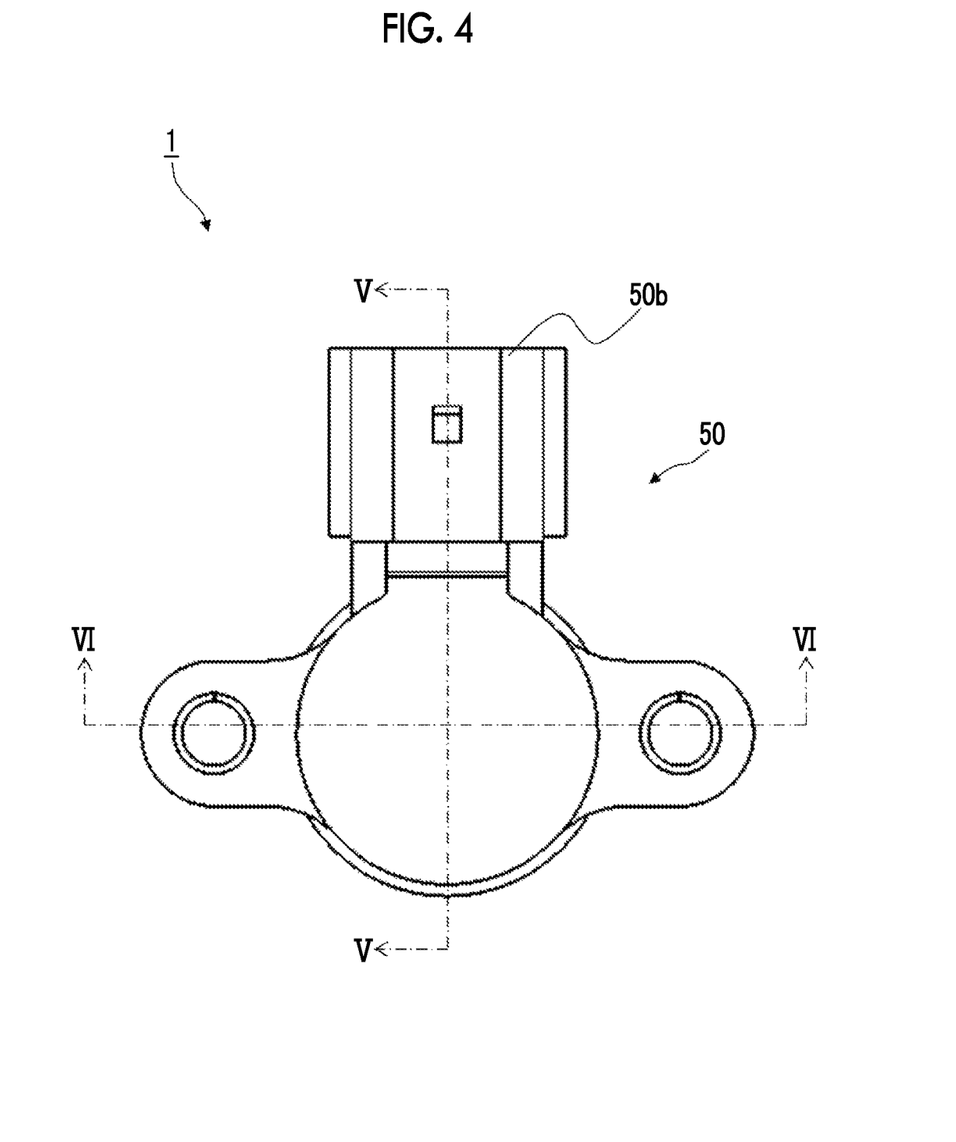
FIG. 4 is a plan view of the position detecting device according to an example embodiment of the disclosure.
Figure 5:
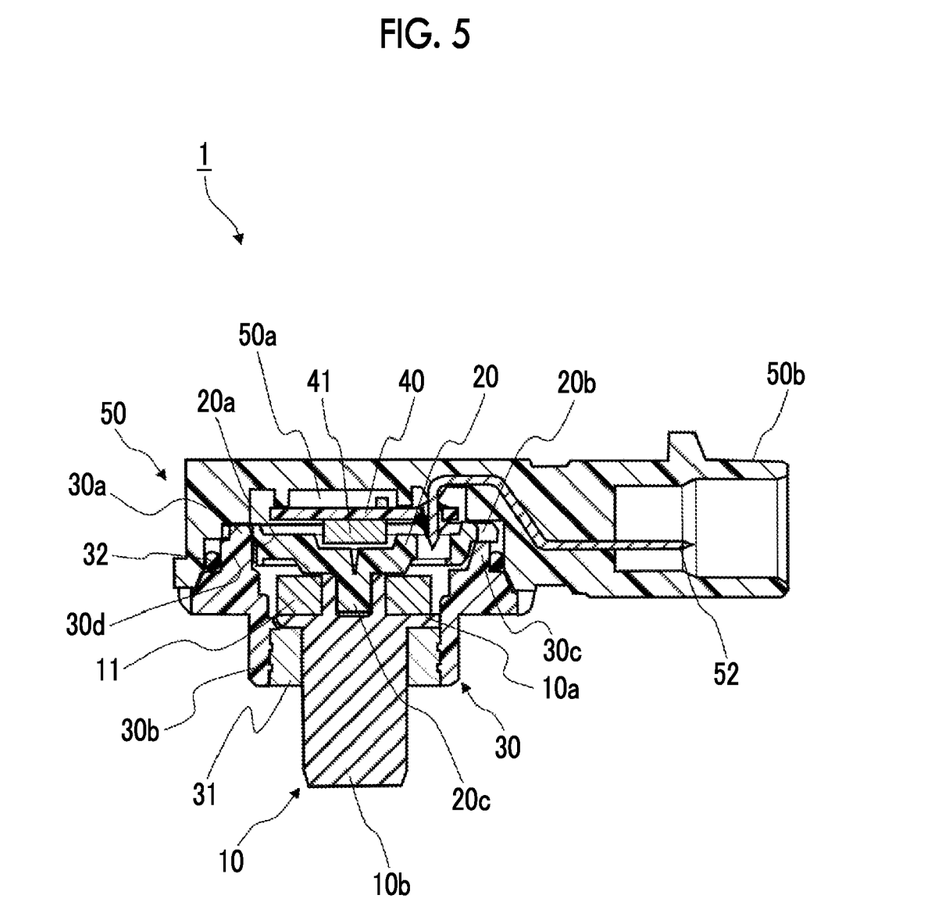
FIG. 5 is a sectional view taken along line V-V of FIG. 4.
Figure 6:
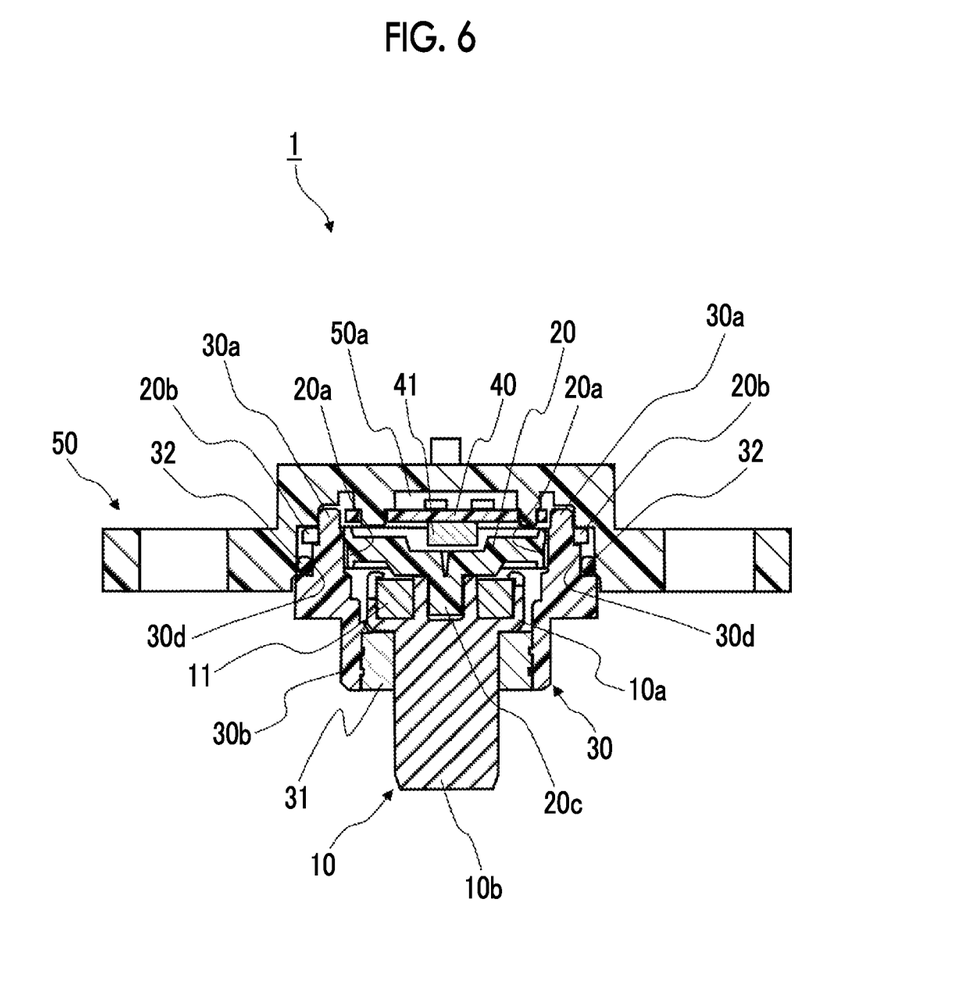
FIG. 6 is a sectional view taken along line VI-VI of FIG. 4.

FIG. 4 is a plan view of the position detecting device 1 according to this embodiment. FIG. 5 is a sectional view taken along line V-V of FIG. 4. FIG. 6 is a sectional view taken along line VI-VI of FIG. 4.

As shown in FIGS. 1 to 6, the position detecting device 1 may include a rotatable shaft part 10, a magnet 11 that is integrally provided on the shaft part 10, and a detecting element 41 that detects the magnetic field of the magnet 11. As shown in FIGS. 2 and 3, the position detecting device 1 further may include a case 50, a substrate 40, a support member 20, a seal member 32, a bearing 31, and a protective member 30. The shaft part 10 may rotate in conjunction with the rotation of an external driving body (not shown), and the position detecting device 1 may detect the rotational position of the shaft part 10. The magnet 11 and the detecting element 41, which serve as a rotational position detecting mechanism, may be disposed so as to face each other with the support member 20 interposed therebetween as shown in FIGS. 2 and 3. Meanwhile, the rotatable magnet 11 may be disposed so as not to come into contact with the detecting element 41 and the support member 20 (see FIGS. 5 and 6). For this reason, since the generation of wear or foreign substances caused by the contact between the magnet 11 and the detecting element 41 of the rotational position detecting mechanism does not occur, the position detecting device 1 has high reliability.

The case 50 may be made of a synthetic resin, and may be integrated so that a disposition portion 50a and a connector portion 50b are formed at the case 50 and a terminal member 52 made of metal is embedded in the case 50. Meanwhile, the case 50 may be made of a non-magnetic synthetic resin having electrical insulating properties.

The magnet 11 may be a substantially cylindrical plastic magnet that has a cavity at the center thereof, and may be integrally provided at one end 10a of the shaft part 10. The shaft part 10 may be made of non-magnetic metal, and may be worked into a shape that fixes the magnet 11. The magnet 11 may be magnetized in a desired state. For example, S poles and N poles are alternately disposed in a circumferential direction.

The detecting element 41 may measure the intensity of a magnetic field that is generated by the magnet 11. More specifically, the detecting element 41 may include at least one one-axis element having a detection sensitivity axis in a predetermined direction on an X-Y plane, and may measure the intensity of a magnetic field in the direction of the detection sensitivity axis of the one-axis element. In this embodiment, a Hall effect element may be used, for example, as the detecting element 41. The detecting element 41 may be mounted on the substrate 40, and may be disposed on the bottomed disposition portion 50a formed at the case 50.

The protective member 30 may be mounted on the case 50 so as to cover the disposition portion 50a. Further, the support member 20 and the bearing 31 may be integrally mounted on the protective member 30. As shown in FIGS. 2 and 3, the protective member 30 may include a cylindrical portion 30b to which the bearing 31 is fitted, a contact portion 30c that comes into contact with the support member 20, and a stepped portion 30d on which the seal member 32 is disposed. As shown in FIGS. 5 and 6, the seal member 32 may be considered to be disposed on the stepped portion 30d of the protective member 30 and close a gap between the case 50 and the stepped portion 30d so that foreign substances or water does not enter the disposition portion 50a of the case 50.

The bearing 31 may support the shaft part 10 so as to allow the shaft part 10 to be rotatable. The shaft part 10 may be inserted into the protective member 30 through the bearing 31 so that the other end 10b of the shaft part 10 protrudes to the outside (see FIGS. 5 and 6).

As shown in FIGS. 2 and 3, the support member 20 may include fitting portions 20a, a flange portion 20b, and a protruding portion 20c. The fitting portions 20a may have a shape that allows protrusions 30a of the protective member 30 to be inserted into the fitting portions 20a. Accordingly, the protrusions 30a may be fitted to the fitting portions 20a. Further, the flange portion 20b may protrude outward from the outer periphery of the contact portion 30c along a surface that comes into contact with the contact portion 30c of the protective member 30. Furthermore, as shown in FIGS. 5 and 6, the protruding portion 20c may support the shaft part 10 so as to allow the shaft part 10 to be rotatable. Accordingly, the support member 20 may be integrated with and fixed to the protective member 30 while supporting the shaft part 10 so as to allow the shaft part 10 to be rotatable.

The terminal member 52 may be exposed from the inner wall surface of the connector portion 50b, and an external connecting member (cable) can be connected to the terminal member 52. Further, the terminal member 52 may be connected to the substrate 40 by solder or the like. Accordingly, the intensity of a magnetic field, which is measured by the detecting element 41, can be used in external electronic devices and the like, as rotational position information.

Next, features of the position detecting device 1 according to this embodiment will be described with reference to FIGS. 5 to 8.

Figure 7:
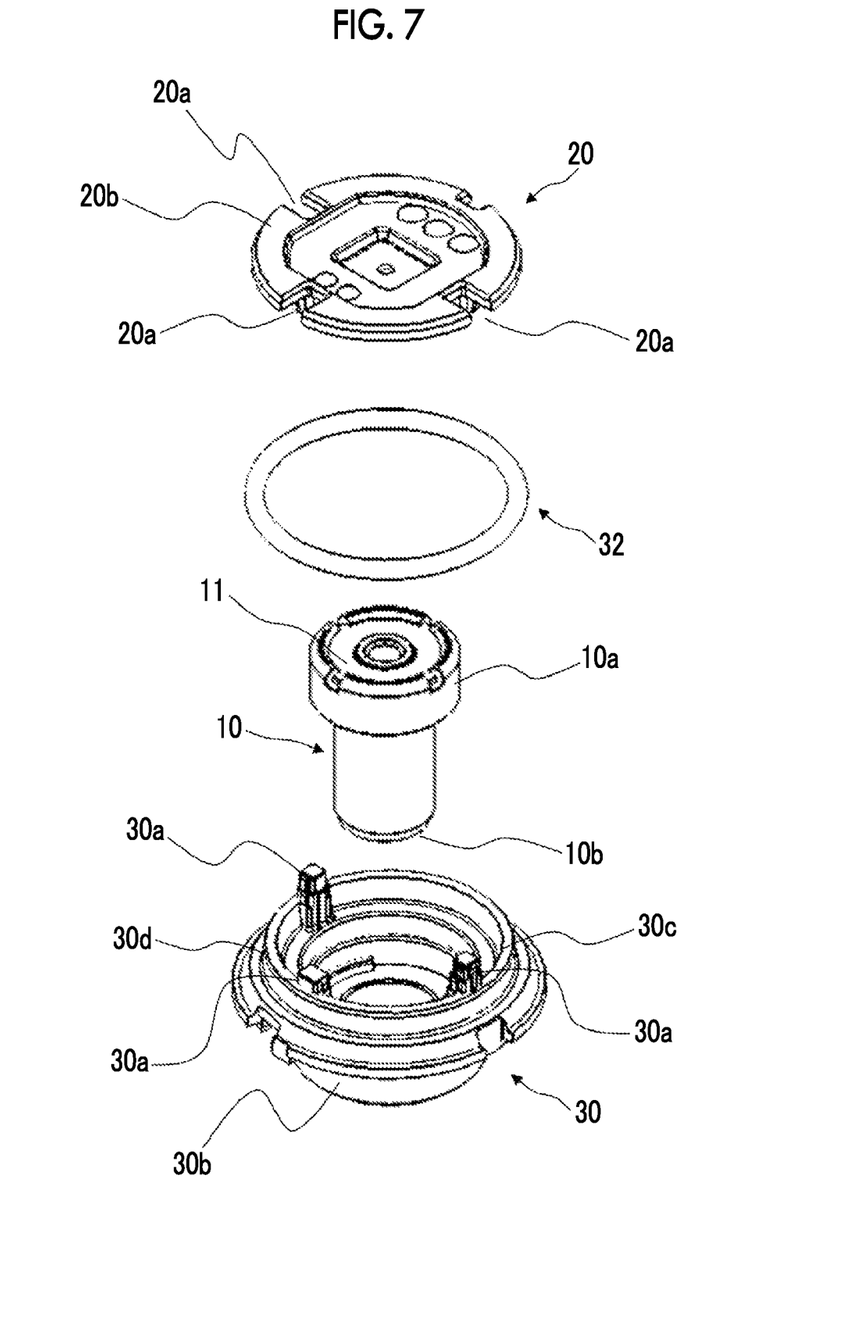
FIG. 7 is an assembly drawing showing that a shaft part is inserted into a protective member on which a bearing has been integrally mounted.
Figure 8:
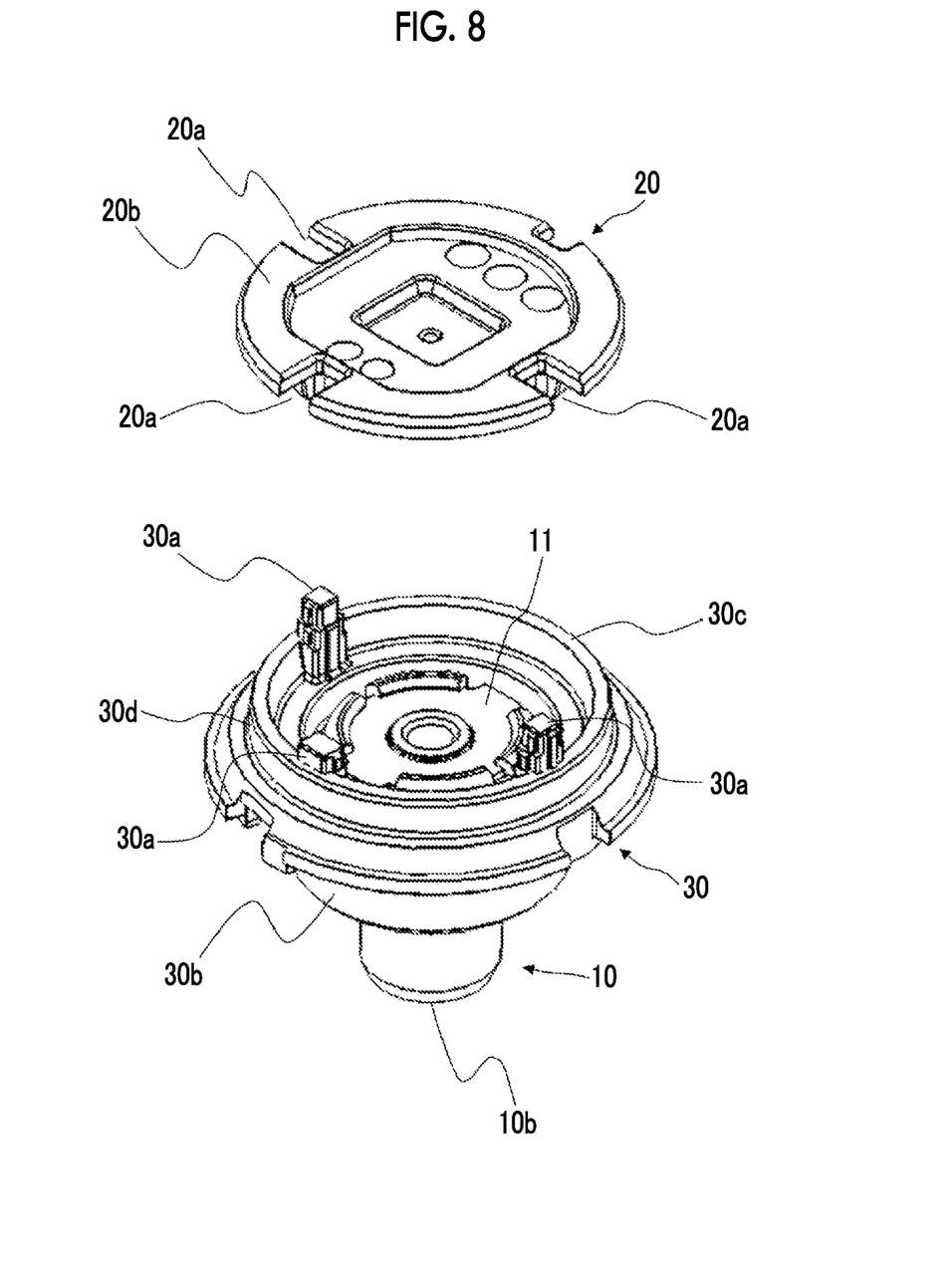
FIG. 8 is an assembly drawing showing a support member and the protective member into which the shaft part has been inserted.
Figure 9:
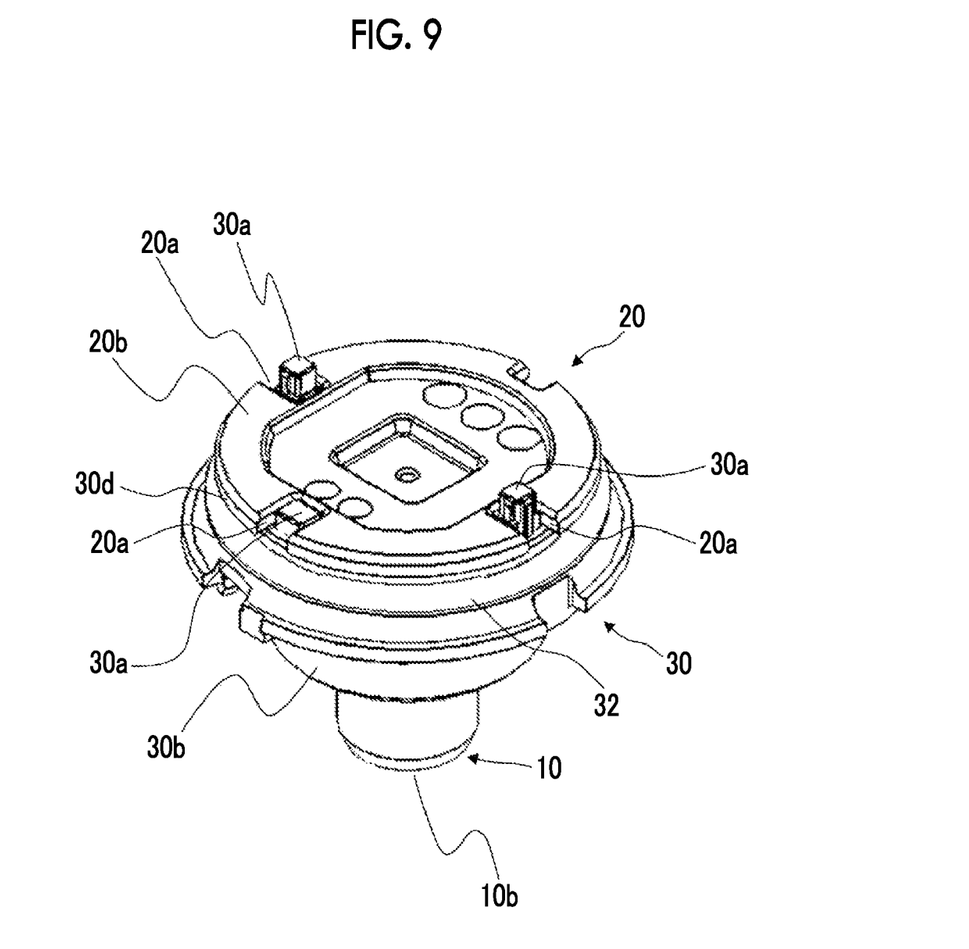
FIG. 9 is an assembly drawing showing that the support member is placed on the protective member into which the shaft part has been inserted.

FIG. 7 depicts an assembly drawing showing that the shaft part 10 is inserted into the protective member 30 on which the bearing 31 has been integrally mounted. FIG. 8 depicts an assembly drawing showing the support member 20 and the protective member 30 into which the shaft part 10 has been inserted. FIG. 9 depicts an assembly drawing showing that the support member 20 is placed on the protective member 30 into which the shaft part 10 has been inserted.

As shown in FIGS. 5 and 6, the shaft part 10 may be rotatably supported by the bearing 31 and one end 10a of the shaft part 10 is supported by the protruding portion 20c of the support member 20. The bearing 31 may be fitted and fixed to the cylindrical portion 30b of the protective member 30.

As shown in FIG. 7, the protective member 30 on which the bearing 31 has been integrally mounted, the shaft part 10 on which the magnet 11 has been integrally mounted, the seal member 32, and the support member 20 are prepared and assembled. That is, after the shaft part 10, which includes the magnet 11 integrally provided at one end 10a, is inserted into the protective member 30 so that the other end 10b protrudes to the outside as shown in FIG. 8, the support member 20 may be placed as shown in FIG. 9. The flange portion 20b may come into contact with the contact portion 30c of the protective member 30 and the protrusions 30a are fitted to the fitting portions 20a, so that the support member 20 is fixed. Accordingly, since the bearing 31 and the support member 20 are integrated with the protective member 30, the shaft part 10 can be supported by only the protective member 30 as a base.

Further, while a state in which the shaft part 10 is supported by the bearing 31 and the support member 20 is maintained, the protective member 30 can be mounted on the case 50. Accordingly, as long as the protective member 30 is mounted through the seal member 32, it is easy to suppress the tilt of the shaft part 10. According to this assembly procedure, assembly is easy and it is possible to accurately suppress the tilt of a rotating shaft.

The outer diameter of the flange portion 20b of the support member 20 may be smaller than an inner diameter to which the seal member 32 can be expanded by being elastically deformed. In this case, since the seal member 32 can be fitted to the stepped portion after the support member 20 is assembled to the protective member 30, assembly is easier.

Accordingly, it is possible to accurately suppress the tilt of the rotating shaft without any variation in accuracy when the protective member 30 is mounted on the case 50 through the seal member 32.

The position detecting device 1 according to the various embodiments may include the shaft part 10 that can rotate in conjunction with the rotation of an external driving body, the magnet 11 that is integrally provided at one end 10a of the shaft part 10, and the substrate 40 on which the detecting element 41 for detecting the magnetic field of the magnet 11 is mounted. Further, the position detecting device 1 may include the case 50 that includes the bottomed disposition portion 50a in which one end 10a of the shaft part 10 and the substrate 40 are disposed, and the protective member 30 into which the other end 10b of the shaft part 10 is inserted so as to protrude to the outside and which is mounted so as to cover the disposition portion 50a. In addition, the position detecting device 1 may include the seal member 32 disposed between the case 50 and the protective member 30. The support member 20, which supports one end 10a of the shaft part 10, and the bearing 31, which supports the shaft part 10 so as to allow the shaft part 10 to be rotatable, may be integrally mounted on the protective member 30; the protective member 30 is provided with the protrusions 30a; the support member 20 may be provided with the fitting portions 20a to which the protrusions 30a are fitted; and the protrusions 30a may be fitted to the fitting portions 20a.

According to this structure, since the support member 20 and the bearing 31 supporting the shaft part 10 are integrated with the protective member 30, the shaft part 10 can be supported by only the protective member 30 as a base. Accordingly, it is possible to accurately suppress the tilt of the rotating shaft without any variation in accuracy when the protective member 30 is mounted on the case 50 through the seal member 32.

Furthermore, in the position detecting device 1 according to this embodiment, the protective member 30 may include the cylindrical portion 30b to which the bearing 31 is fitted, the contact portion 30c that comes into contact with the support member 20, and the stepped portion 30d on which the seal member 32 is disposed. In addition, the support member 20 includes the flange portion 20b that protrudes outward from the outer periphery of the contact portion 30c along the surface that comes into contact with the contact portion 30c.

According to this structure, since the seal member 32 does not deviate in the axial direction, the disposition portion 50a can be hermetically sealed from the outside.

Further, in the position detecting device 1 according to an example embodiment, the support member 20 may include the protruding portion 20c that supports one end 10a of the shaft part 10, and is fitted to and integrated with the protective member 30 while supporting the shaft part 10 so as to allow the shaft part 10 to be rotatable.

According to this structure, the shaft part 10, the protective member 30, and the support member 20 can be integrally assembled after the magnet 11 is fitted to the shaft part 10.

The position detecting device 1 according to an example embodiment of the invention has been specifically described above. However, the invention is not limited to the above-mentioned embodiment and may be variously modified without departing from the gist. For example, the invention may have the following modifications, and these modifications are also included in the scope of the invention.

(1) In this embodiment, the protective member 30 has been provided with the protrusions 30a and the support member 20 has been provided with the fitting portions 20a to which the protrusions 30a are fitted. However, the support member 20 may be changed to be provided with the protrusions and the protective member 30 may be changed to be provided with the fitting portions. That is, one of the protective member 30 and the support member 20 may be provided with the protrusions, the other thereof may be provided with the fitting portions to which the protrusions are fitted, and the protrusions may be fitted to the fitting portions.

(2) In this embodiment, the support member 20 has been provided with the protruding portion 20c. However, the support member 20 may be changed to be provided with a recess, which receives one end 10a of the shaft part 10, instead of the protruding portion 20c. The shaft part 10 has only to be rotatably supported by this recess.

(3) In this embodiment, a Hall effect element has been used as the detecting element 41. However, a magnetoresistive effect element may be used as the detecting element 41.

It should be understood by those skilled in the art that various modifications, combinations, sub-combinations and alterations may occur depending on design requirements and other factors insofar as they are within the scope of the appended claims of the equivalents thereof.

Accordingly, the embodiments of the present inventions are not to be limited in scope by the specific embodiments described herein. Further, although some of the embodiments of the present disclosure have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

What is claimed is:

1. A position detecting device comprising:
   a shaft part that rotates in conjunction with a rotation of an external driving body;
   a magnet that is integrally provided at one end of the shaft part;
   a substrate on which a detecting element that detects a magnetic field of the magnet is mounted;
   a case that includes a bottomed disposition portion in which one end of the shaft part and the substrate are disposed;
   a protective member into which the other end of the shaft part is inserted so as to protrude to the outside and which is mounted so as to cover the disposition portion; and
   a seal member that is disposed between the case and the protective member,
   wherein a support member, which supports one end of the shaft part, and a bearing, which supports the shaft part so as to allow the shaft part to be rotatable, are integrally mounted on the protective member, and
   one of the protective member and the support member is provided with a protrusion, the other thereof is provided with a fitting portion to which the protrusion is fitted, and the protrusion is fitted to the fitting portion.

2. The position detecting device according to claim 1,
   wherein the protective member includes a cylindrical portion to which the bearing is fitted, a contact portion that comes into contact with the support member, and a stepped portion on which the seal member is disposed, and
   the support member includes a flange portion that protrudes outward from an outer periphery of the contact portion along a surface coming into contact with the contact portion.

3. The position detecting device according to claim 2,
   wherein the support member includes a protruding portion that supports one end of the shaft part, and is fitted to and integrated with the protective member while supporting the shaft part so as to allow the shaft part to be rotatable.

4. The position detecting device according to claim 1,
   wherein the support member includes a protruding portion that supports one end of the shaft part, and is fitted to and integrated with the protective member while supporting the shaft part so as to allow the shaft part to be rotatable.

* * * * *